March 10, 1953     T. R. McGOWAN     2,630,883
BRAKE MECHANISM
Filed June 23, 1948     3 Sheets-Sheet 1
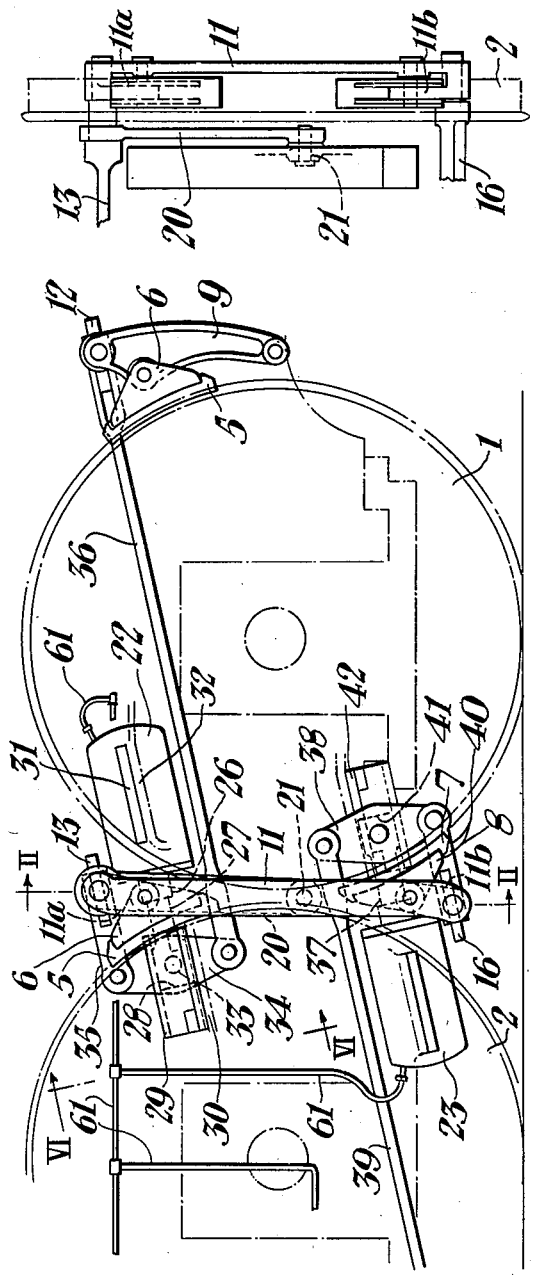
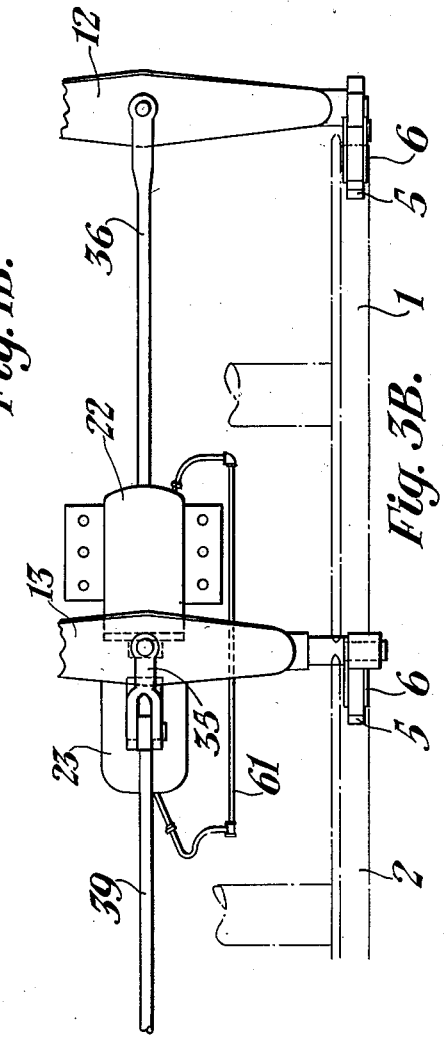
INVENTOR.
Thomas R. McGowan.
BY
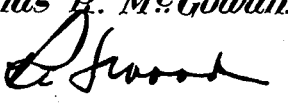
HIS ATTORNEY

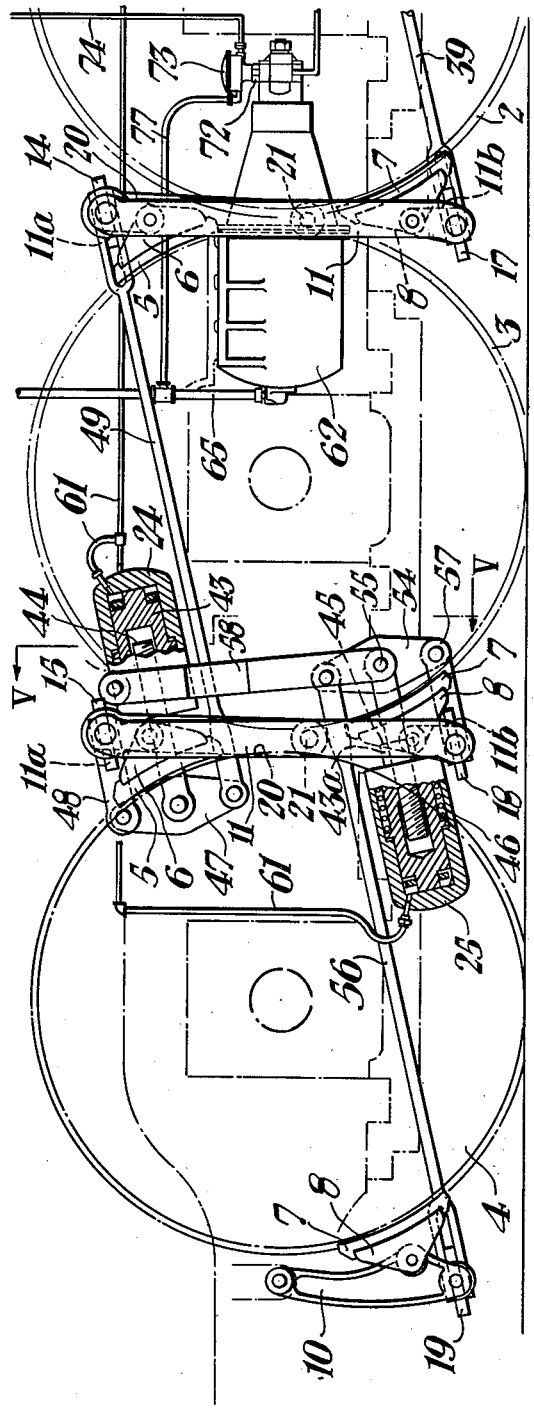

March 10, 1953 — T. R. McGOWAN — 2,630,883
BRAKE MECHANISM
Filed June 23, 1948 — 3 Sheets-Sheet 3
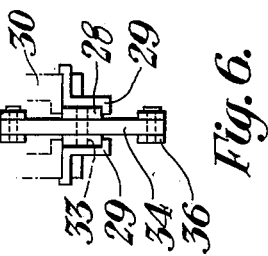
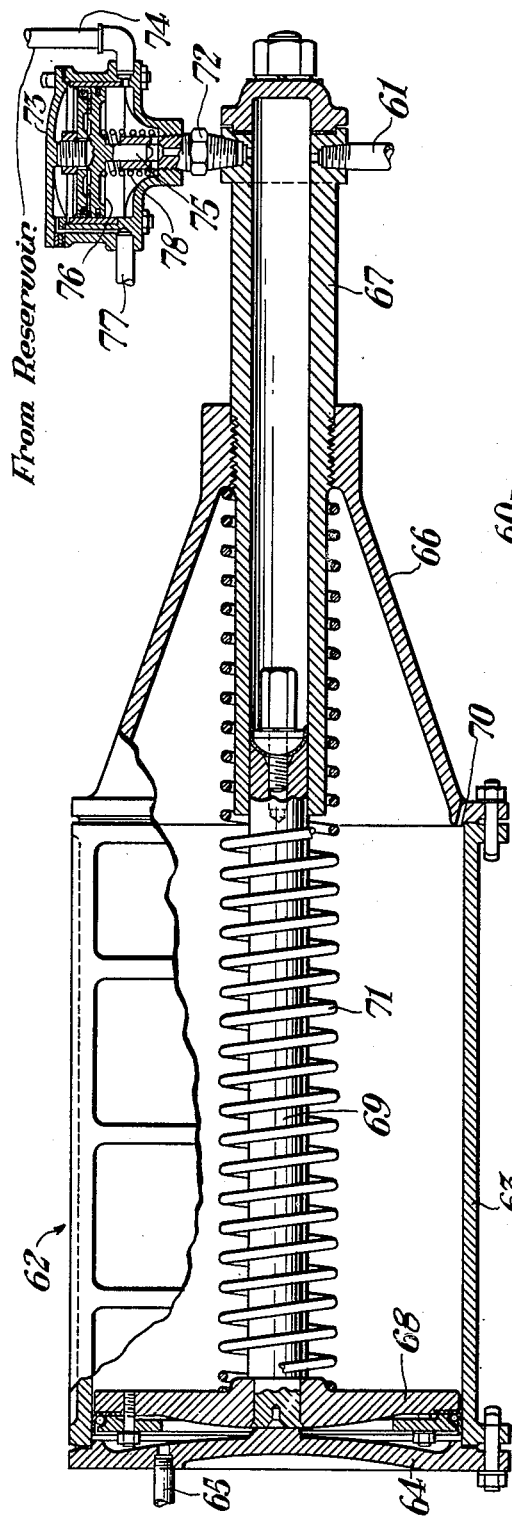
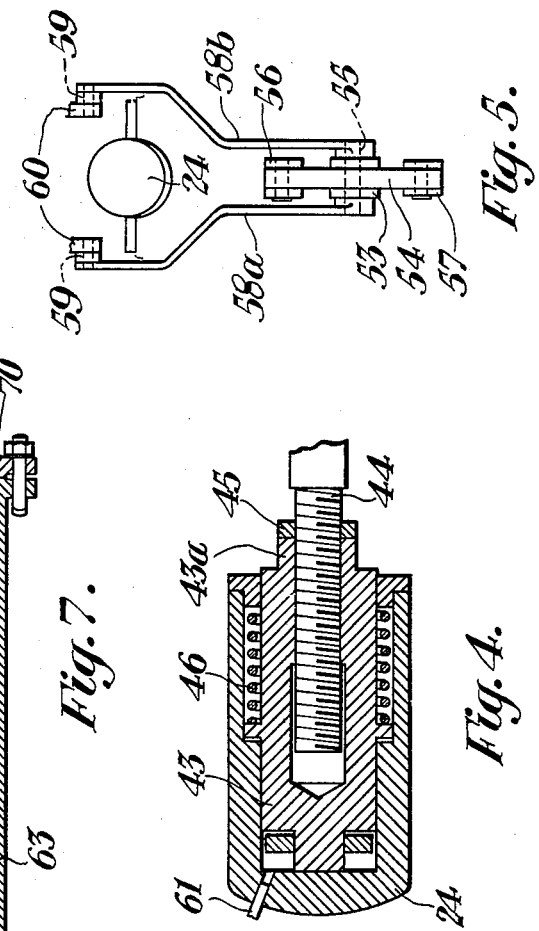
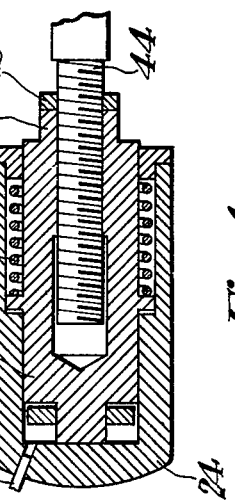
INVENTOR.
Thomas R. McGowan.
BY
HIS ATTORNEY Patented Mar. 10, 1953

2,630,883

UNITED STATES PATENT OFFICE 2,630,883

BRAKE MECHANISM

Thomas R. McGowan, St. Louis, Mo., assignor to The American Brake Company, Swissvale, Pa., a corporation of Missouri Application June 23, 1948, Serial No. 34,609

7 Claims. (Cl. 188—54)

My invention relates to brake mechanism, and especially to mechanism for operating the brakes on a railway vehicle such as a locomotive.

Brake shoes for railway locomotives are commonly operated by pneumatic motors or cylinders which operate the brake shoes through force multiplying levers and linkages. The braking force required on a locomotive depends, among other things, upon the weight of the locomotive and the speed at which it is to be operated. There is at present a tendency to increase both the speed and the weight in the design of new locomotives. The resulting requirements for increased braking forces means either that the pneumatic cylinders which operate the brakes must be increased in size and power, or that the force multiplying linkages between the cylinders and the brakes must be changed to increase their mechanical advantage. Of course, such a change in the force multiplying linkage means that the linkage must be larger. However, the increase in speed and weight of locomotives has also resulted in changes in truck design which leaves less space available than heretofore for the brake operating mechanism. It is therefore becoming increasingly difficult to provide the required braking forces with conventional pneumatic cylinders and mechanical linkages.

It has been proposed to operate the brake shoes on a locomotive by means of hydraulic cylinders to be supplied with hydraulic fluid at extremely high pressures from a ram or accumulator operated by a single large pneumatic cylinder. In such an arrangement, the force multiplying mechanism becomes quite simple, and the connection between the accumulator and the various hydraulic cylinders can be made by means of pipes and tubes which require relatively small space as compared to a mechanical linkage.

It is therefore an object of my invention to provide an improved mechanism for operating the brakes of a locomotive by means of a plurality of hydraulic cylinders.

Another object is to provide an improved and simplified brake rigging for the truck of a railway vehicle.

Another object is to provide an improved fluid motor means which may be used in a braking mechanism of the type described.

A further object is to provide an improved hanger lever arrangement for use in a brake mechanism of the type described.

Another object is to provide an improved slack adjuster structure which is combined with a fluid motor in a novel manner.

My invention is illustrated herein as applied to an eight-wheel locomotive truck having clasp brakes and conventional brake beams connecting each brakehead with the corresponding brakehead on the opposite side of the truck. I accomplish the foregoing objects of my invention by operating two horizontally adjacent brake beams with one hydraulic cylinder. The piston rod associated with the cylinder is connected to the center of an equalizer lever. Each end of the equalizer lever is directly connected by a link to the center of one of the two brake beams operated by the cylinder. The truck illustrated has extremely close clearances between the wheels. The front brake shoe on each wheel is located above a horizontal plane passing through the wheel centers, and the rear brake shoe is located below that plane. Therefore, the front brake shoe and brake beam for each wheel are located substantially above the rear brake shoe and brake beam for the immediately preceding wheel. I provide a novel support for these vertically adjacent brake beams and shoes consisting of a connecting hanger lever pivoted at its ends to the ends of the brake beams and a supporting link whose upper end is pivoted to the upper brake beam and whose lower end is pivoted on a fixed support.

I mount the several hydraulic cylinders with their axes lying in a vertical plane passing through the center of the truck and parallel to the wheels. The axes of the cylinders are tilted at an angle with the horizontal, and the links connecting the equalizer lever with the brake beams are substantially parallel to the cylinder axes. This arrangement results in comparatively straight line thrust forces acting on the cylinder and piston, and force couples tending to rotate the cylinder, piston and various linkage elements are minimized. The tilting of the cylinders and links contributes materially to the compactness of the rigging and in maintaining necessary clearances.

Several different forms of fluid motor arrangements are illustrated. However, in all cases the piston rod is rigidly connected to the piston so that it moves only in a straight line with respect to the cylinder. In one form of fluid motor, the outer end of the piston rod is guided by a fixed guide which aids the cylinder in absorbing any lateral forces applied to the piston rod. In another fluid motor arrangement, I mount the cylinder on trunnions so that it pivots freely, and support the outer end of the piston rod by means of a link connected to a fixed support. In that way, the lateral forces passing through the piston and cylinder are minimized, most of them being taken by the supporting link.

In all of the fluid motor arrangements, I provide a novel slack adjuster mechanism comprising a threaded connection between the piston and the piston rod. One end of the piston extends outside the cylinder and is provided with a polygonal head which may be grasped by a wrench to rotate the piston on the rod. The distance between the inner end of the piston and the outer end of the piston rod may thereby be varied to take up slack existing between the piston and the brake shoes. Suitable means are provided for locking the piston rod to the piston in any adjusted position.

Other objects and characteristic features of my invention will become apparent as the description proceeds.

I shall illustrate and describe herein several forms of brake mechanisms embodying my invention, and shall then point out the novel features thereof in claims.

In the accompanying drawings, Figs. 1A and 1B taken together form a side elevational view of a locomotive truck equipped with brake mechanism embodying my invention. Fig. 2 is a sectional view taken substantially along the line II—II of Fig. 1B. Figs. 3A and 3B taken together form a top view of the brake mechanism of Fig. 1, with certain parts omitted for the sake of clarity. Fig. 4 is a sectional view of one of the hydraulic cylinders. Fig. 5 is a sectional view taken on the line V—V of Fig. 1A. Fig. 6 is a sectional view taken on the line VI—VI of Fig. 1B. Fig. 7 is an enlarged sectional view of a hydraulic accumulator forming part of the brake system.

Figs. 1A and 1B are intended to be placed end to end with Fig. 1A at the left. There is shown in these figures one side of an eight-wheel locomotive truck. Four driving wheels appear in the drawings. These are numbered 1, 2, 3, and 4, respectively, beginning with the front wheel. Each of the four drive wheels has clasp brakes including a front brake shoe 5 supported by a brakehead 6 and a rear brake shoe 7 supported by a brakehead 8. The front brakehead 6 associated with the front wheel 1 is carried on a supporting lever 9 of conventional construction. Similarly, the rear brakehead 8 on the rear wheel 4 is supported by a brake hanger lever 10 of conventional construction. Each vertically adjacent pair of the intervening brakeheads is supported by a brake hanger lever 11. Each hanger lever 11 has an extension 11a at its upper end which supports the front brakehead 6 of one wheel and an extension 11b at its lower end which supports the rear brakehead 8 of the preceding wheel. The front brake shoes at the opposite sides of the truck are connected by upper brake beams 12, 13, 14, and 15 associated with the wheels 1, 2, 3, and 4, respectively. Similarly, the rear brake shoes at the opposite sides of the truck are connected by means of lower brake beams 16, 17, 18, and 19, respectively. Each of the brake beams 13, 14, and 15 is pivotally supported at its ends on upstanding links, illustrated at 20 in the drawings (see Fig. 2). The lower ends of the links 20 are pivotally attached to the frame of the truck by means of pins 21.

The hanger levers 11 are pivotally supported at their upper ends by the brake beams 13, 14, and 15, and at their lower ends of the hanger levers 11 respectively pivotally support the brake beams 16, 17, and 18. The several brake beams, brakeheads, brake shoes and the hanger levers 11 are all supported on the links 20.

Four fluid pressure motors or hydraulic cylinders 22, 23, 24, and 25 are provided. Each of these cylinders operates two of the brake beams with its associated brakeheads and shoes. Cylinder 22 operates brake beams 12 and 13. Cylinder 23 operates brake beams 16 and 17. Cylinder 24 operates brake beams 14 and 15. Cylinder 25 operates brake beams 18 and 19.

Cylinder 22 is provided with a piston 26, to which is attached a piston rod 27. The outer end of piston rod 27 is provided with a block 28 which slides in guides 29 carried by a bracket 30 attached to the frame of the truck (see Fig. 6). The cylinder 22 is also provided with lateral flanges 31 suitably fastened by means not shown to a bracket 32 which is attached to the truck frame.

The block 28 on piston rod 27 is pivotally connected by means of a pin 33 to an equalizer lever 34 intermediate its ends. The upper end of equalizer lever 34 is connected by means of a link 35 to the center of brake beam 13. The lower end of equalizer lever 34 is connected by means of an elongated link 36 to the center of brake beam 12.

Cylinder 23 is similar to cylinder 22. It operates a piston rod 37 which is connected to an equalizer lever 38 intermediate its ends. The upper and lower ends of equalizer lever 38 are connected through links 39 and 40 respectively to the centers of brake beams 17 and 16.

The end of piston rod 37 is provided with a guide block 41 which operates in guides 42, similar to the guide block 28 and guides 29 of cylinder 22.

Cylinder 24 is generally similar to cylinders 22 and 23, differing therefrom chiefly in the omission of the guide slot and stationary guide at the outer end of the piston rod. Cylinder 24 is shown in section in Fig. 4 of the drawings, so that its internal construction may be more readily observed. This construction is typical of the four cylinders. Cylinder 24 is provided with a piston 43, threadedly connected to a piston rod 44. A lock nut 45 is provided to fix the relative position of piston 43 and piston rod 44. The piston 43 is provided with an extension 43a which has a hexagonal or other suitable polygonal head for engagement by a wrench. When the lock nut 45 is loosened, a wrench may be applied to the extension 43a to rotate the piston and thereby adjust its position relative to piston rod 44. The purpose of this adjustment will be explained later. A spring 46 within the cylinder 24 biases piston 43 in a brake releasing direction.

The outer end of piston rod 44 is connected to an equalizer lever 47 intermediate its ends. The upper and lower ends of lever 47 are respectively connected through links 48 and 49 to the centers of the brake beams 15 and 14.

Cylinder 25 is generally similar to the other cylinders 22, 23, and 24, except as to the details of its supporting structure. This cylinder 25 is provided with opposite laterally extending trunnions 50 (see Fig. 3A) which ride in bearing blocks 51 supported by the truck frame. Cylinder 25 is provided with a piston (not shown) which operates a piston rod 53 connected to an equalizer lever 54 intermediate its ends by means of a pin 55. The upper and lower ends of lever 54 are respectively connected through links 56 and 57 to the brake beams 19 and 18, respectively.

The pin 55 is supported, and hence the cylinder 25 and piston rod 53 are also supported in part by a link 58. As shown in Fig. 5, the link 58 comprises a pair of strap links 58a and 58b whose upper ends are separated to straddle the cylinder 24. These strap links are supported by pins 59 extending through lugs 60 formed on the frame of the truck. The lower ends of the strap links 58a and 58b are apertured to receive the ends of the pin 55.

Each cylinder has its axis generally parallel to the links which connect its piston rod to its associated brake beams. The cylinders and the links are mounted so as to be tilted with respect to the horizontal. This parallel arrangement of the cylinders and links aids in reducing lateral forces tending to bind the piston in the cylinder. The tilting of these elements makes the rigging more compact and aids materially in ensuring proper clearances between the various parts.

The cylinders 22, 23, 24, and 25 are supplied with hydraulic fluid through pipe 61 which leads to the outlet of a hydraulic ram or accumulator generally indicated at 62.

The structural details of the accumulator 62 are illustrated in Fig. 7. Referring to that figure, there is shown a large air cylinder 63, one end of which is closed by a cover 64 apertured to receive an air inlet pipe 65. The other end of cylinder 63 is closed by a generally conical casting 66 whose small end is apertured to receive a hydraulic fluid cylinder 67. Inside the air cylinder 63 is a piston 68 connected to a piston rod 69 which extends within the hydraulic cylinder 67 and forms a plunger within that cylinder. The air cylinder 63 is vented to atmosphere at 70. A compression spring 71 is retained between the piston 68 and the inner face of the conical casting 66. The spring 71 biases the piston 68 to its extreme left-hand position, as it appears in the drawing.

The outer end of hydraulic cylinder 67 is connected to the fluid outlet pipe 61 and a fluid inlet pipe 72. The inlet pipe 72 is connected through a check valve generally indicated at 73 with a pipe 74 leading to a suitable reservoir of hydraulic fluid.

The check valve 73 includes a valve member 75 operated by a piston 76, subject on its lower surface to the pressure of the hydraulic fluid entering from the reservoir and on its upper surface to the air pressure supplied through an air inlet pipe 77. A spring 78 biases the piston 76 upwardly to a position wherein the valve member 75 permits a free flow of fluid from the pipe 74 to the inlet pipe 72.

When it is desired to operate the several brake shoes to their braking positions, an air valve is operated to admit air under pressure to the pipes 65 and 77, which are connected together as illustrated in Fig. 1A. Air entering the check valve 73 from pipe 77 acts downwardly on piston 76, moving the valve member 75 to its closed position, so that hydraulic fluid cannot move out of the cylinder 67 through pipe 74 to the reservoir. At the same time, air under pressure is supplied through pipe 65 to the left end, as it appears in the drawings, of the large air cylinder 63. This pressure moves piston 68 to the right, against the spring 71, thereby building up a pressure in the hydraulic fluid in cylinder 67. Since the cross sectional area of cylinder 67 is much smaller than that of air cylinder 63, it may be seen that the hydraulic pressure built up within the cylinder 67 is much greater than the pressure of the air supplied through pipe 65 to air cylinder 63. For example, the air pressure may be 100 pounds per square inch and the areas of the two cylinders so related that the hydraulic pressure is 1500 pounds per square inch. Hydraulic fluid at this high pressure is transmitted through the pipe 61 to the several cylinders 22, 23, 24, and 25. There the high pressure fluid acts to move the several pistons out of their respective cylinders, thereby operating the associated piston rods, equalizer levers, and links to move the several brake beams so that the brake shoes are applied to their respective wheels.

When it is desired to release the brakes, the pipe 65 is vented to atmosphere by means of the usual control valve. The spring 71 then returns piston 68 to the position shown in Fig. 7, thereby relieving the hydraulic pressure in the several hydraulic cylinders. The return springs, such as 46, associated with each of the hydraulic cylinders then return their associated braking mechanisms to their non-braking position. The release of pressure from pipe 65 also releases the pressure in pipe 77, so that the inlet valve member 75 is again opened. The hydraulic cylinder 67 is thereby again connected to the reservoir of hydraulic fluid, so that if any deficiency of fluid occurs in the piston because of leakage or otherwise, it may be made up from the reservoir at any time except when the brakes are actually being applied.

It should be particularly pointed out that the several equalizers and links are so arranged in connection with each of the hydraulic cylinders that the major forces acting on the piston act parallel to the cylinder axis, resulting in a minimum of binding between the piston and cylinder. In the case of cylinders 22 and 23, the guide blocks 28 and 41 and the guides 29 and 42 serve to counteract and absorb any laterally acting force which might otherwise be applied to the piston rod so as to cause a binding action of the piston in the cylinder. In the case of cylinder 25, any binding action of the piston in the cylinder is prevented by the trunnion mounting of the cylinder which permits it to take up any rotational position required by the position of supporting link 58. Any lateral forces acting through the equalizer lever 54 are counteracted and absorbed by the supporting link 58.

In connection with each of the hydraulic cylinders 22, 23, 24, and 25, I have provided novel slack adjusting means comprising a threaded connection between the piston rod and the cylinder, as shown in detail in Fig. 4, in connection with cylinder 24. By adjusting the relative position of the piston 43 and the piston rod 44, any slack occurring between the piston 43 and the brake shoes may be taken up. After an adjustment is made, the parts may be fixed by means of the lock nuts 45.

Although I have herein shown and described several forms of brake mechanism embodying my invention, it is understood that various changes and modifications may be made therein within the scope of the appended claims without departing from the spirit and scope of my invention.

Having thus described my invention, what I claim is:

1. Brake mechanism for an eight-wheel truck, comprising front and rear brake shoes for each wheel, the front shoes being located above a horizontal plane passing through the wheel centers and the rear shoes being located below said plane, a brakehead for each shoe, means including brake beams connecting each brakehead with the opposite head on the other side of the truck, said wheels being closely spaced so that the brake beam for each pair of front shoes lie above the brake beam for the rear shoes of the preceding pair of wheels, operating means for said brake beams comprising four brake cylinders, each operating two horizontally adjacent brake beams, each cylinder being mounted at the center of the truck adjacent one of said two brake beams and having its axis tilted with respect to the horizontal and lying in a plane parallel to the wheels, a piston rod driven by the cylinder, an equalizer lever pivoted intermediate its ends to said piston rod and movable in a vertical plane, a link directly connecting one end of the equalizer lever to the center of said one brake beam, another link directly connecting the other end of the equalizer lever to the center of the other of the two adjacent brake beams, brake hanger levers pivotally connecting each pair of vertically adjacent brake beams, said hanger levers lying outside the plane of the wheels, and a supporting link for each upper brake beam pivoted at its lower end to the truck and at its upper end to the brake beam, said supporting links lying inside the plane of the wheels.

2. Brake mechanism for an eight-wheel truck, comprising front and rear brake shoes for each wheel, the front shoes being located above a horizontal plane passing through the wheel centers and the rear shoes being located below said plane, a brakehead for each shoe, means including brake beams connecting each brakehead with the opposite head on the other side of the truck, said wheels being closely spaced so that the brake beam for each pair of front shoes lies above the brake beam for the rear shoes of the preceding pair of wheels, operating means for said brake beams comprising four brake cylinders, each operating two horizontally adjacent brake beams, each cylinder being mounted at the center of the truck adjacent one of said two brake beams and having its axis tilted with respect to the horizontal and lying in a plane parallel to the wheels, a piston rod driven by the cylinder, an equalizer lever pivoted intermediate its ends to said piston rod and movable in a vertical plane, a link directly connecting one end of the equalizer lever to the center of said one brake beam, another link directly connecting the other end of the equalizer lever to the center of the other of the two adjacent brake beams, and brake hanger levers pivotally connecting each pair of vertically adjacent brake beams.

3. Brake mechanism for an eight-wheel truck, comprising front and rear brake shoes for each wheel, the front shoes being located above a horizontal plane passing through the wheel centers and the rear shoes being located below said plane, a brakehead for each shoe, means including brake beams connecting each brakehead with the opposite head on the other side of the truck, said wheels being closely spaced so that the brake beam for each pair of front shoes lies above the brake beam for the rear shoes of the preceding pair of wheels, operating means for said brake beams comprising four brake cylinders, each operating two horizontally adjacent brake beams, each cylinder being mounted at the center of the truck adjacent one of said two brake beams and having its axis tilted with respect to the horizontal and lying in a plane parallel to the wheels, a piston rod driven by the cylinder, an equalizer lever pivoted intermediate its ends to said piston rod and movable in a vertical plane, a link directly connecting one end of the equalizer lever to the center of said one brake beam, and another link directly connecting the other end of the equalizer lever to the center of the other of the two adjacent brake beams.

4. Brake mechanism for an eight-wheel truck, comprising front and rear brake shoes for each wheel, the front shoes being located above a horizontal plane passing through the wheel centers and the rear shoes being located below said plane, a brakehead for each shoe, means including brake beams connecting each brakehead with the opposite head on the other side of the truck, said wheels being closely spaced so that the brake beam for each pair of front shoes lies above the brake beam for the rear shoes of the preceding pair of wheels, operating means for said brake beams comprising four fluid motors, each operating two horizontally adjacent brake beams, an equalizer lever operatively connected intermediate its ends to said fluid motor, a link directly connecting one end of the equalizer lever to one of said two brake beams, and another link directly connecting the other end of the equalizer lever to the other of the two adjacent brake beams.

5. Brake mechanism for a truck having a plurality of pairs of wheels, comprising at least one shoe for each wheel, said shoes being located on corresponding sides of said wheels, means including brake beams connecting each shoe with the corresponding shoe on the opposite side of the truck, operating means for two of the brake beams including a hydraulic cylinder, a piston in said cylinder, a piston rod attached to said piston, an equalizer lever pivotally attached intermediate its ends to the piston rod, a link directly connecting one end of the equalizer lever to one of said two brake beams, another link directly connecting the other end of the equalizer lever to the other of said two brake beams, and means including a pneumatically operated ram for supplying hydraulic fluid under pressure to said cylinder to operate said two brake beams to braking positions.

6. Brake mechanism for a truck having a plurality of pairs of wheels, comprising at least one shoe for each wheel, said shoes being located on corresponding sides of said wheels, means including brake beams connecting each shoe with the corresponding shoe on the opposite side of the truck, operating means for two of the brake beams including a cylinder located at the center of the truck adjacent one of the two brake beams and having its axis tilted with respect to the horizontal and lying in a plane parallel to the wheels, a piston in said cylinder, a piston rod attached to said piston, an equalizer lever pivotally attached intermediate its ends to the piston rod and movable in a vertical plane, a link directly connecting one end of the equalizer lever to the center of said one brake beam, and another link directly connecting the other end of the equalizer lever to the center of the other of said two brake beams.

7. Brake mechanism for a truck having a plurality of pairs of wheels, comprising at least one shoe for each wheel, said shoes being located on corresponding sides of said wheels, means including brake beams connecting each shoe with the corresponding shoe on the opposite side of the truck, operating means for two of the brake beams including a cylinder located at the center of the truck adjacent one of the two brake beams and having its axis tilted with respect to the horizontal and lying in a plane parallel to the wheels, a piston in said cylinder, a piston rod attached to said piston, an equalizer lever pivotally attached intermediate its ends to the piston rod and movable in a vertical plane, a link directly connecting one end of the equalizer lever to the center of said one brake beam, another link directly connecting the other end of the equalizer lever to the center of the other of said two brake beams, and means for supporting the outer end of the piston rod to absorb forces transmitted thereto through said equalizer lever.

THOMAS R. McGOWAN.

REFERENCES CITED

The following references are of record in the file of this patent:

UNITED STATES PATENTS

| Number | Name | Date |
| --- | --- | --- |
| 276,479 | Schnier et al. | Apr. 24, 1883 |
| 1,755,305 | Osborn | Apr. 22, 1930 |
| 2,210,038 | Mueller | Aug. 6, 1940 |
| 2,242,015 | Mueller | May 13, 1941 |
| 2,275,916 | Mueller | Mar. 10, 1942 |
| 2,298,008 | Goepfrich | Oct. 6, 1942 |
| 2,360,967 | Mueller | Oct. 24, 1944 |
| 2,505,986 | Mueller | May 2, 1950 |